(12) United States Patent
Syassen

(10) Patent No.: US 9,056,426 B2
(45) Date of Patent: Jun. 16, 2015

(54) METHOD FOR THE THERMAL JOINING OF TWO COMPONENTS, AND A THERMAL JOINING STRIP

(75) Inventor: Freerk Syassen, Stadland (DE)

(73) Assignee: Airbus Operations GmbH (DE)

( * ) Notice: Subject to any disclaimer, the term of this patent is extended or adjusted under 35 U.S.C. 154(b) by 144 days.

(21) Appl. No.: 13/234,330

(22) Filed: Sep. 16, 2011

(65) Prior Publication Data

US 2012/0067498 A1 Mar. 22, 2012

Related U.S. Application Data

(60) Provisional application No. 61/383,373, filed on Sep. 16, 2010.

(30) Foreign Application Priority Data

Sep. 16, 2010 (DE) .......................... 10 2010 040 933

(51) Int. Cl.
*B32B 37/06* (2006.01)
*B32B 37/04* (2006.01)
(Continued)

(52) U.S. Cl.
CPC .............. *B29C 66/45* (2013.01); *B29C 65/024* (2013.01); *B32B 37/144* (2013.01); *B01J 2219/00783* (2013.01); *Y10T 156/10* (2015.01); *Y10T 428/12222* (2015.01); *B29C 65/344* (2013.01); *B29C 65/3444* (2013.01); *B29C 65/3448* (2013.01); *B29C 65/3468* (2013.01); *B29C 66/30341* (2013.01); *B29C 66/71* (2013.01); *B29C 66/721* (2013.01); *B29C 66/7212* (2013.01); *B29C 66/73921* (2013.01); *B29C 66/919* (2013.01); *B29C 65/3476* (2013.01); *B32B 5/024* (2013.01); *B32B 15/02* (2013.01); *B32B 15/043* (2013.01); *B32B 15/08* (2013.01); *B32B 15/14* (2013.01); *B32B 27/12* (2013.01); *B32B 2250/40* (2013.01); *B32B 2262/103* (2013.01); *B29C 65/16* (2013.01); *B29C 65/342* (2013.01); *B29C 65/348* (2013.01); *B29C 65/36* (2013.01); *B29C 66/345* (2013.01); *B29C 66/83221* (2013.01); *B32B 15/013* (2013.01); *B32B 15/015* (2013.01);
(Continued)

(58) Field of Classification Search
CPC . B29L 2009/003; B32B 37/06; B32B 37/144; B29C 65/024; B01J 2219/00783
USPC ............................................ 156/308.2, 309.6
See application file for complete search history.

(56) References Cited

U.S. PATENT DOCUMENTS 3,817,356 A * 6/1974 Dahlquist ..................... 188/268
2004/0067705 A1* 4/2004 Ton-That et al. ............... 442/65
(Continued)

OTHER PUBLICATIONS

Nanofoil, Indium Corporation website, http://www.indium.com/nanofoil/, retrieved Oct. 24, 2011.

*Primary Examiner* — Scott W Dodds
(74) *Attorney, Agent, or Firm* — Lerner, David, Littenberg, Krumholz & Mentlik, LLP

(57) ABSTRACT

A method for a thermal joining of two thermoplastic components includes arranging at least one reactive sheet entity in a mating zone between the two thermoplastic components. A multiply perforated metallic sheet entity configured as a bonding agent is disposed on each side of the at least one reactive sheet entity, at least in some regions of the mating zone. The at least one reactive sheet entity is activated so as thermally join the two thermoplastic components in the regions of the mating zone.

8 Claims, 2 Drawing Sheets

(51) Int. Cl.
*B29C 65/00* (2006.01)
*B29C 65/02* (2006.01)
*B32B 37/14* (2006.01)
*B29C 65/34* (2006.01)
*B32B 5/02* (2006.01)
*B32B 15/02* (2006.01)
*B32B 15/04* (2006.01)
*B32B 15/08* (2006.01)
*B32B 15/14* (2006.01)
*B32B 27/12* (2006.01)
*B32B 15/01* (2006.01)
*B23K 35/00* (2006.01)
*B23K 35/02* (2006.01)
*B29C 65/16* (2006.01)
*B29C 65/36* (2006.01)

(52) U.S. Cl.
CPC ............ *B32B 15/017* (2013.01); *B23K 35/001* (2013.01); *B23K 35/0233* (2013.01); *B29C 66/91411* (2013.01)

(56) References Cited

U.S. PATENT DOCUMENTS

2005/0082344 A1    4/2005  Pong et al.
2008/0224413 A1*   9/2008  Doane et al. .................. 277/323

* cited by examiner

METHOD FOR THE THERMAL JOINING OF TWO COMPONENTS, AND A THERMAL JOINING STRIP

CROSS REFERENCE TO PRIOR APPLICATIONS

Priority is claimed to German Patent Application No. DE 10 2010 040 933.2, filed Sep. 16, 2010 and U.S. Provisional Application No. 61/383,373, filed Sep. 16, 2010. The entire disclosure of both applications is incorporated by reference herein.

FIELD

The invention relates to a method for the thermal joining of two components.

BACKGROUND

In modern aeroplane construction, alongside classic metallic materials such as, for example, aluminium alloys and titanium alloys, components made from plastic materials increasingly also find application in the structural field. By this means a high potential for weight saving ensues, which amongst other factors leads to a reduced fuel consumption in flight operations. Moreover, in comparison to metallic materials, plastic materials have a higher corrosion resistance, as a result of which in particular the maintenance effort can be significantly reduced. Carbon fibre- or glass fibre-reinforced thermoplastic high-performance plastics, or fibre-reinforced thermosetting plastics, are widely deployed as the plastic materials. The joining together of metallic materials and plastic materials in many cases takes place by means of connecting elements, such as for example, rivets or bolts. However, additional weight is introduced into the structure by these connecting elements. In addition, the necessary holes in the components represent a structural weakening of the overall structure, and moreover require a high level of production effort. Thermal joints for such components feature in contrast a high load-bearing capability and require no additional connecting elements. Frequently, however, the thermal joining together of thermoplastic plastic components with one another, or of plastic components with metallic components causes significant technical process problems, since, amongst other factors, ensuring that the effects of the necessary joining temperatures are locally limited represents a high level of procedural effort, and moreover the joining of large-scale thermoplastic components requires large furnaces. In addition, it is difficult to ensure a sufficiently high process reliability that will lead to reliably reproducible results for the joints.

US 2005/0082344 A1 describes a method for the thermal joining of metallic components with the use of flammable foils that are already sold under the trade name NANOFOIL. These foils are metallic reactive sheet entities constructed with an alternating sequence of thousands of layers of aluminium and nickel foils of minimal material thickness—in each case between 5 and 8 nm—is placed between the components to be joined and allows an exact local generation of the process heat that is necessary for the joining process. The central property of these reactive sheet entities consists in the fact that they can ignite as a result of a one-time supply of a small amount of energy, and thereby develop a temperature of between 1000° C. and 1500° C. in the region of the ignition front. After the reactive sheet entity has been ignited the temperature front automatically progresses through the reactive sheet entity with a speed of up to 50 m/s, so that the joining process is quickly completed. The thermal joining takes place preferably in the course of a soldering or brazing process as a consequence of the release of temperature by the reactive sheet entity. By virtue of the locally limited release of temperature any overheating of the components to be joined is all but ruled out. The reactive sheet entity can be provided on one or both sides with joint filler materials, for example, in the form of foils, in order to support the soldering processes. On account of the extraordinarily intense development of the temperature of the reactive sheet entities deployed, the thermal joining of components constituted from thermoplastic materials with a metallic component, or the welding of two components constituted from a thermoplastic material, is in particular impossible, since in the region of the reactive sheet entities temperatures are reached, which, as a rule, lie above the decomposition temperature of the thermoplastic plastics deployed.

SUMMARY OF THE INVENTION

In an embodiment, the present invention provides a method for a thermal joining of two thermoplastic components. At least one reactive sheet entity is arranged in a mating zone between the two thermoplastic components. A multiply perforated metallic sheet entity configured as a bonding agent is disposed, at least in some regions of the mating zone, on each side of the at least one reactive sheet entity. The at least one reactive sheet entity is activated so as to thermally join the two components in the regions of the mating zone.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

In the drawings the same design elements have the same reference numbers in each case.

DETAILED DESCRIPTION

Figure 1:
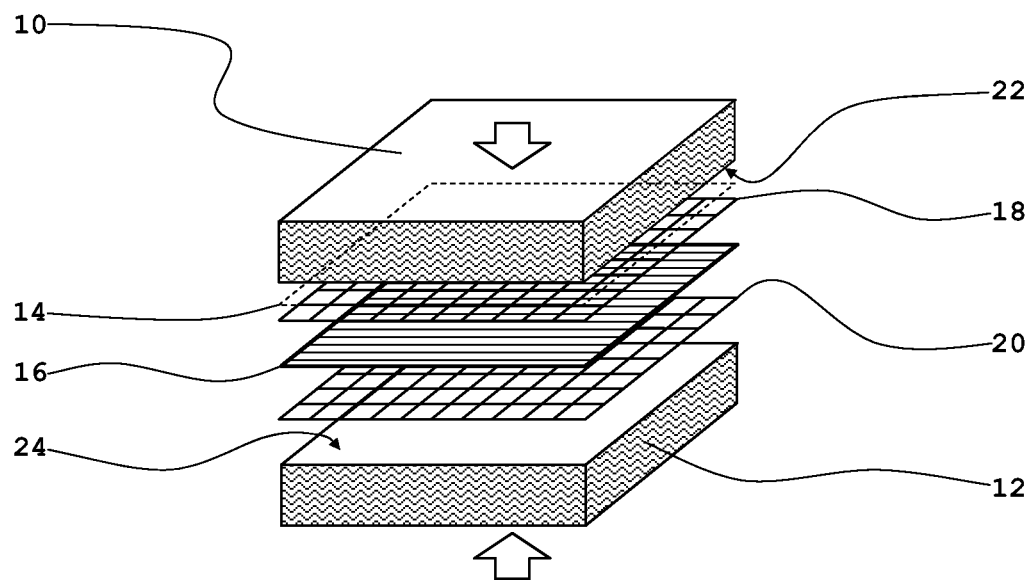
FIG. 1 shows a schematic representation of the procedure during the joining of two components constituted from a thermoplastic plastic material.

An embodiment of the present invention provides a method for the thermal joining of two components constituted from thermoplastic materials, or for the thermal joining of one component constituted from a thermoplastic material with a component constituted from a metallic material, with the use of reactive sheet entities. In addition, an aspect provides a thermal joining strip for the thermal joining of such components.

An embodiment of the present invention provides a method for the thermal joining of two components, both components are constituted from a thermoplastic material, and the heat necessary for the joining process is generated in a mating zone by means of at least one reactive sheet entity, in particular with at least one sold under the trade name NANOFOIL.

A further embodiment of the present invention provides a method for the thermal joining of two components, wherein the one component is constituted from a thermoplastic material, and the other component is constituted from a metallic material, and the heat necessary for the joining process is generated in a mating zone by means of at least one reactive sheet entity, in particular with at least one sold under the trade name NANOFOIL.

In an embodiment, a thermal joining strip for the thermal joining of two components is provided, wherein at least one component is constituted from a thermoplastic plastic material, and the thermal joining strip, at least in some sections, has at least one layer with a reactive sheet entity, in particular with at least one sold under the trade name NANOFOIL, for purposes of generating the heat necessary for the joining process.

An embodiment provides a method with the following steps:
a) arrangement of the at least one reactive sheet entity in the mating zone,
b) placement in position, at least in some regions, of a multiply perforated metallic sheet entity, in particular a metallic gauze, as a bonding agent on each side of the reactive sheet entity, and
c) thermal joining of the components in the region of the mating zone by the activation of the reactive sheet entity.

In step a) of the method a reactive sheet entity, which preferably takes the form of a reactive sheet entity marketed under the NANOFOIL trade name, is firstly introduced into the mating zone. Reactive sheet entities of this type have a material thickness of up to 0.8 mm. In step b) of the method a fine metallic gauze is arranged at least in some regions on both sides of the reactive sheet entity. The metallic gauze can, for example, be constructed with a multiplicity of fine wires made from a stainless steel alloy (on a chromium-nickel basis). The metallic gauze arranged on both sides of the reactive sheet entity has amongst others the purpose, conducted in a metered manner, of evening out or buffering the high temperatures of between 1000° C. and 1500° C. initiating from the reactive sheet entity during ignition, to prevent thermal decomposition or destruction of the components constituted from thermoplastic plastics, and at the same time to enable their thermal melting, defined by regions, in the mating zone in the course of the joining process. The metallic gauze is preferably formed with fine metallic wires made from a stainless steel alloy. Instead of a metallic gauze, a metallic knit, a metallic weave made from metallic wires, or also a perforated foil, can be used. The wires of the metallic gauze, or the metallic wires used in its manufacture, can be provided with a non-metallic coating, which can be constituted from a ceramic material or a plastic material.

If required the sequence of steps a) and b) can be changed over, wherein a complete structure, i.e. an arrangement consisting of the reactive sheet entity and the metallic gauzes arranged on both sides, prepared in step a), can be placed as an entity in the mating zone in step b). In step c) of the method the ignition of the reactive sheet entity takes place to initiate the joining process; this can take place, for example, as a result of the supply of electrical energy, or a small quantity of heat. By this means the reactive sheet entity is irreversibly "ignited" and thereby releases a temperature in a range between 800° C. and 1500° C., as a result of which the two thermoplastic components are melted together in the region of the mating zone and joined as a material bond. The ignition front within the reactive sheet entities, and thus the active melting, i.e. joining, zone, then progresses automatically with a speed of up to 50 m per second, so that even long mating zones can be joined in a very short time without any problems. For the ignition of the reactive sheet entity the one-time achievement of a local temperature of between some 60° C. and 300° C.—depending on the type of foil deployed—is necessary. The ignition can take place, for example, by means of a hot wire, inductive heating, by means of a laser, or via another source of heat. As a consequence of the plasticisation of the components in the region of the mating zone, the metallic gauzes arranged on both sides on the reactive sheet entity are penetrated by the thermoplastic plastic matrix, as a result of which an intimate form of interlocking is produced. As a consequence the metallic gauze, in addition to its function as a temperature buffer, also has the function of a bonding agent between the thermoplastic components. Ultimately there comes into being in the region of the mating zone a connection in the form of a material bond and, at least in part, a form fit, between the thermoplastic matrix of the two components, the two metallic gauzes, and any reaction products and/or remains of the reactive sheet entity, which mechanically can be highly loaded. By virtue of the inventive method, moreover, a locally limited and exactly defined introduction of heat into the thermoplastic components ensues, so that their mechanical properties to a large extent remain undisturbed by the joining process. As a result the thermoplastic components are indirectly heated through by the metallic gauze during the joining process, and by this means their surfaces are plasticised in the mating zone.

A further development of the method envisages that before the thermal joining the components are aligned with one another and pressed together with the application of mechanical pressure.

By this means any gaps and voids that are present, which, amongst other factors, could prevent the transfer of heat between the components to be joined, the reactive sheet entity and the meshes arranged on both sides, are eliminated, as a result of which an optimal result is achieved for the joint, as is at the same time a high level of dimensional stability of the joined components. The fixing of location between the cited components can, for example, take place by means of holes passing through the components and rivet clamps that can be removed later. The required mechanical pressure can, for example, be built up by means of a vacuum bag, or with rivet clamps, presses, cramps or similar. For the thermal joining of a metallic and a thermoplastic component a higher pressure is required in comparison to that required for the thermal joining of two thermoplastic components.

In accordance with a stipulation of a further development of the method, provision is made that a material thickness of the perforated metallic sheet entity is selected as a function of a melting temperature of the components constituted from the thermoplastic material.

By means of a variation of the material thickness of the perforated metallic sheet entity deployed, in particular of the metallic gauze, it is possible to influence in a targeted manner the quantity of heat as well as the speed of the heat transfer of the heat emitted from the reactive sheet entity into the thermoplastic plastic components to be joined in the region of the mating zone, and in this manner to match the process to the different melting temperatures of various thermoplastic plastic systems. Considerable significance can be attributed to this factor, since modern thermoplastic high-performance plastics as a rule, have significantly higher melting temperatures, than is the case, for example, for polyethylene or polypropylene.

A further embodiment of the present invention provides a method with the following steps:

a) arrangement of the at least one reactive sheet entity in the mating zone,
b) placement in position, at least in some regions, of a multiply perforated metallic sheet entity, in particular a metallic gauze, as a bonding agent on the side of the reactive sheet entity that is to be joined with the thermoplastic component, and
c) thermal joining of the components in the region of the mating zone by the activation of the reactive sheet entity.

In an embodiment, a thermal joint is formed between a component constituted from a thermoplastic material and a component constituted from a metallic material. Accordingly in step b) of the method just the side of the reactive sheet entity that is to be joined together with the thermoplastic component is covered with the metallic gauze. The other, opposite side of the reactive sheet entity, which is facing towards the metallic component, can in many cases be directly thermally joined with the latter. Here too the sequence of steps a) and b) can be changed over, wherein the complete structure prepared in step a), consisting of the reactive sheet entity, and the metallic gauze arranged on the one side of the reactive sheet entity, and the metallic foil located on the other side, can be placed in the mating zone in step b).

In other respects steps a) to c) correspond to the steps of above-discussed method, so that with regard to their elucidation reference can be made to the comments made further above.

A further development of the method envisages that, before the thermal joining, a non-perforated metallic sheet entity, in particular a metallic foil, is placed, at least in some regions, as a joint filler material on the side of the reactive sheet entity, which is to be joined with the metallic component.

By the application of the joint filler material, preferably present in the form of a foil, the joining process between the reactive sheet entity and the metallic component can be aided, or in some circumstances made possible at all for the first time. The metallic foil can be constituted from any ancillary (soft) soldering, brazing or welding materials, such as for example a soldering alloy, a brazing alloy, or a welding alloy.

In accordance with the stipulations of a further development of the method, before the thermal joining the components are aligned with one another and pressed together with the application of mechanical pressure.

By this means a mechanically intimate contact, to a large extent free of interspaces, is achieved between the reactive sheet entity, the optional metallic foil located on the other side as a joint filler material, and the mating surfaces of the components, in order to achieve a quality that is as high as possible, and load-bearing capability of the joint location.

In the case of a further development of the method provision is made that a material thickness of the perforated metallic sheet entity is selected as a function of a melting temperature of the thermoplastic to be joined with the metallic component.

By this means the method can be optimally matched to the respective melting temperature of the thermoplastic plastic deployed in the manufacture of the thermoplastic component. Correspondingly, by a variation of the material thickness of the optional metallic foil, in some circumstances serving as a joint filler material, the joining temperature in the mating zone between the reactive sheet entity and the metallic component can be exactly matched to the respective process requirements.

In accordance with the invention one side of the reactive sheet entity is provided, at least in some regions, with a sheet entity having a multiplicity of perforations, in particular with a metallic gauze, as a bonding agent, and the other side of the reactive sheet entity is provided, at least in some regions with the sheet entity having a multiplicity of perforations, or with a non-perforated metallic sheet entity, in particular with a metallic foil, as a joint filler material.

With the first variant of embodiment of the thermal joining strip two components constituted from a thermoplastic material can be joined, while the second variant of embodiment of the thermal joining strip, in which a metallic gauze is applied on only one side of the reactive sheet entity, is provided for purposes of joining together a thermoplastic component with a metallic component.

In an embodiment, the mechanical connection between the at least one reactive sheet entity and the at least one metallic gauze as a bonding agent, or the metallic foil as an optional joint filler material can, for example, take place by means of stitching or stapling by means of fine metallic wires, and/or by means of adhesive. An overall material thickness of the complete structure of the thermal joining strip should hereby not exceed 1.0 mm, in order to maintain a low thickness for the joint seam. By virtue of this low material thickness the thermal joining strip is, as a rule, sufficiently flexible to enable it to be rolled on. In the integration of large-scale shell components for the integration of barrel-shaped fuselage sections of aeroplanes, the thermal joining strip can e.g. be continuously removed from a storage reel, cut to length, and then automatically supplied to the mating zones between the components. By means of the inventive thermal joining strip it is possible to simplify further the procedure through the steps in the process in the course of execution of the inventive method.

Moreover, it is possible, for the manufacturer to fit a component that is to be thermally joined to a further component in the mating zone envisaged, at least in some regions, with the thermal joining strip. For example, the thermal joining strip can be placed and attached in the mating zone of a thermoplastic component or a metallic component. For purposes of manufacturing a joining connection with a further component, the components are then only located above one another in the region of the mating zone, aligned and pressed together. To create the thermal joining connection the reactive sheet entity is subsequently triggered, i.e. ignited. In the fitting by the manufacturer of the (first) component with the thermal joining strip the initially free side of the reactive sheet entity, which is later to be joined with a thermoplastic (second) component, is overlaid with a metallic gauze to promote bonding, or for the case in which the (second) component to be joined is constituted from a metallic material, is overlaid with the metallic foil as an ancillary material. Correspondingly the non-free side of the reactive sheet entity that is facing towards the first component, is covered with a metallic foil or with a metallic gauze, depending upon its material composition. The fixing in location by the manufacturer of the thermal joining strip on a component can, for example, take place with the use of adhesive in some sections. This means that at this stage no final thermal joint has yet been formed between the thermal joining strip and the component that is pre-fitted with the latter. In a deviation from the use of adhesive the thermal joining strip can be attached with alternative connecting technologies, as long as the reactive sheet entity is not ignited as a result. Fundamentally, the thermal joining strip—independently of whether it has already been arranged by the manufacturer on a component, or is only placed in position in the mating zone during the joining process—is either provided for purposes of the thermal joining of two thermoplastic components, or for purposes of joining a metallic component with a thermoplastic component.

FIG. 1 illustrates a schematic representation of the procedure for the joining together of two components, each of which is constituted from a thermoplastic plastic material.

Two components 10, 12 that are to be connected with one another are to be thermally joined together, that is to say, materially bonded, in the region of a mating zone 14, in accordance with the stipulations of the inventive method. Both components 10, 12 are constituted from a thermoplastic plastic material, which if necessary is reinforced with a fibre reinforcement. Polyetheretherketone (PEEK), polyphenylensulphide (PPS), or similar can, for example, find application as the thermoplastic plastic material. The fibre reinforcement can be structured, for example, with carbon fibres or with glass fibres. In a first step a) of the method a reactive sheet entity 16 is placed in position, preferably over the full surface area of the mating zone. Alternatively the reactive sheet entity 16, for amongst other reasons to limit the heat generation, can just be placed in position in some regions in the mating zone 14, insofar as the mechanical load-bearing capability of a joint manufactured in such a manner is sufficient for the intended application. The reactive sheet entity 16 takes the form of a layered material, which is constructed with a multiplicity of extremely thin layers of aluminium and nickel, each arranged in an alternating manner one above another. The aluminium and the nickel foils in each case have a material thickness of between 5 nm and 8 nm. A reactive sheet entity from the company RNT Reactive Nano Technologies Inc., USA can, for example, find application as the reactive sheet entity 16; this is marketed under the trade name NANOFOIL. In a further form of embodiment of the method two, three or a plurality of reactive sheet entities 16 can be placed in position in the mating zone 14, at least in some regions.

In step b) of the method two metallic gauzes 18, 20 are placed in position on either side of the reactive sheet entity 16. Alternatively the reactive sheet entity 16 can be fitted in advance with the metallic gauze on both sides, and the entity constituted in this manner can be placed between the components 10, 12. The metallic gauzes 18, 20 are constructed with a multiplicity of fine metallic wires, which are manufactured, for example, from a stainless steel alloy or a titanium alloy. Instead of the metallic gauze 18, 20 other multiply perforated metallic sheet entities, such as, for example, perforated foils, can be deployed. The two metallic gauzes 18, 20 represent an interface, i.e. a bonding agent, for the two mating surfaces 22, 24 of the two thermoplastic components 10, 12. By means of suitable selection of a material thickness for the two metallic gauzes 18, 20 thermal overheating of the thermoplastic components 10, 12 in the mating zone 14 is prevented, as a result of which an optimal result is achieved for the joint. The two metallic gauzes 18, 20 even out and distribute the high temperatures of some 800° C. to 1,500° C. generated by the reactive sheet entity 16 after ignition in the mating zone 14 and ensure moreover, by virtue of their buffering properties, a delayed transfer of heat. Without the presence of the thermally-moderating metallic gauzes 18, 20, the quantity of heat generated by the reactive sheet entity 16 would lead to thermal damage of the components 10, 12, at least in the region of the mating zone 14. Before the ignition of the reactive sheet entity 16 the components 12 are pressed together with a defined force in the direction of the two white arrows in order to achieve optimum results.

In the final step c) of the method the ignition of the reactive sheet entity 16 takes place; this can take place, for example, as a result of an electrical pulse or the supply of a defined quantity of heat. The ignition of the reactive sheet entity 16 preferably takes place only on one side edge. Alternatively, the reactive sheet entity 16 can also be ignited at a plurality of side edges at the same time, or at intervals of time. With the ignition of the reactive sheet entity 16 the thermal joining process between the thermoplastic components 10, 12 is initiated and completed after a very short period of time, since the ignition front or heat front that passes in the form of a wave through the reactive sheet entity 16 propagates with a speed of up to 50 m per second. As a consequence of the large quantity of heat generated by the reactive sheet entity 16 in the mating zone 14 a connection in the form of a material bond and, in part, a form fit is formed between the mating surfaces 22, 24, the metallic gauzes 18, 20, and also remains and/or reaction products of the reactive sheet entity 16. An at least punctiform melting of the metallic gauzes 18, 20, is possible by virtue of the high level of heat generated during the joining process.

The material bond component of the connection occurs as a result of the confluence of the liquefied and/or plasticised components 10, 12, at least in some regions, after the ignition of the reactive sheet entity 16 in the region of the mating surfaces 22, 24, while the form fit component of the connection is formed as a result of the plasticised plastic material, which penetrates into the metallic gauzes 18, 20, and upon cooling interlocks with the latter in an intimate manner.

By means of the inventive method, the possibility is opened up of creating a connection between two components 10, 12 constituted from thermoplastic plastics that can be highly loaded mechanically. By this means even large-scale components can be thermally joined with a small amount of effort in terms of production engineering. A joint created in accordance with this first variant of the method between the two thermoplastic components 10, 12 comprises the reactive sheet entity 16 and/or its remains and/or reaction products, and also the metallic gauzes 18, 20.

Figure 2:
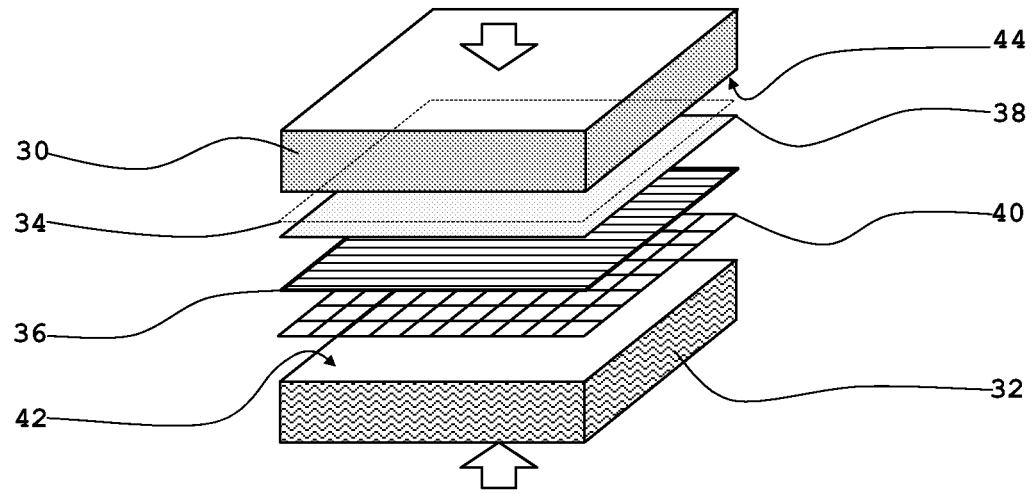
FIG. 2 shows a schematic representation of the procedure during the joining of a thermoplastic component and a metallic component.

FIG. 2 illustrates the inventive procedure during the joining together of two components, 30, 32, which are constituted from different materials.

In step a) of the method a reactive sheet entity 36 is introduced between two components, 30, 32 in the region of a mating zone 34. The reactive sheet entity 36 preferably has the same size and/or surface extent as the mating zone 34. Alternatively, the reactive sheet entity 36 can also only be applied in some regions of the mating zone 34. The upper component 30 is constituted from a metallic material, for example an aluminium alloy, a stainless steel alloy, or a titanium alloy, while the lower component 32 is constituted from a thermoplastic plastic material, if required with fibre reinforcement.

In step b) of the method a metallic foil 38, is arranged above the reactive sheet entity 36, at least in some regions, as a non-perforated, metallic sheet entity, while underneath the reactive sheet entity 36—in a manner corresponding to the procedure when joining two thermoplastic components—a metallic gauze 40 is placed in position. Alternatively, the metallic gauze 40 and the metallic foil 38 can be arranged on the reactive sheet entity in advance and the entity prepared in such a manner can then be introduced between the components that are to be joined. Here the function of the metallic gauze 40 corresponds to the function of the metallic gauze deployed when thermally joining two thermoplastic components, so at this point reference is made to the statements made in the context of the description of FIG. 1. The metallic foil 38 and the metallic gauze 40 form once again the technical interface of the joint between the two mating surfaces 42, 44 facing towards one another of the components 30, 32.

The metallic film 38 serves primarily as a joint filler material, in order to promote or make possible at all for the first time the joining process, in particular in the form of metallic (soft) soldering, brazing, or welding processes between the reactive sheet entity 36 and the metallic component 30. The metallic foil 38 can, for example, be constituted from soft solder materials, hard solder materials or welding solder materials, which primarily serve as joint filler materials or as auxiliary joining materials. In general the metallic foil 38—depending on the alloy composition of the metallic component 30—is constituted from a complex alloy composition that is specially matched to the latter. In the case of certain material combinations the metallic foil 38 can also be omitted in the execution of the method. In the preparation for the final joining process the components, 30, 32 are in general aligned with one another and after positioning has been completed are pressed together by means of a defined force in the direction of the two white arrows, in order to close any voids or gaps that are present between the reactive sheet entity 36, the metallic foil 38, the metallic gauze 40, and the components, 30, 32, and to achieve optimal results for the joint. At the same time a secure location is by this means achieved for the components, 30, 32 before and during the joining process.

In step c) of the method the ignition of the reactive sheet entity 36 takes place as a result of the supply of a small quantity of external energy. By this means the desired irreversible thermal joining process is initiated between the mating surfaces 42, 44 of the two components, 30, 32 of the metallic foil 38, the metallic gauze 40, as well as residues and/or decomposition products of the reactive sheet entity 36.

A joint location or a joint region between a metallic component 30 and a thermoplastic component 32 executed in accordance with this variant of the method comprises the reactive sheet entity 36 and/or remains and/or reaction products of the same, the metallic foil 38 and the metallic gauze 40.

In the case of both variants of the method the metallic gauzes 18, 20, 40, at least in the region of the mating surfaces 22, 24, 42, are permeated, at least in some regions, by molten thermoplastic material of the components, 10, 12, 32 and/or in the case of fibre-reinforced thermoplastic components, by the thermoplastic plastic matrix, i.e. they are penetrated by the latter.

Figure 3:
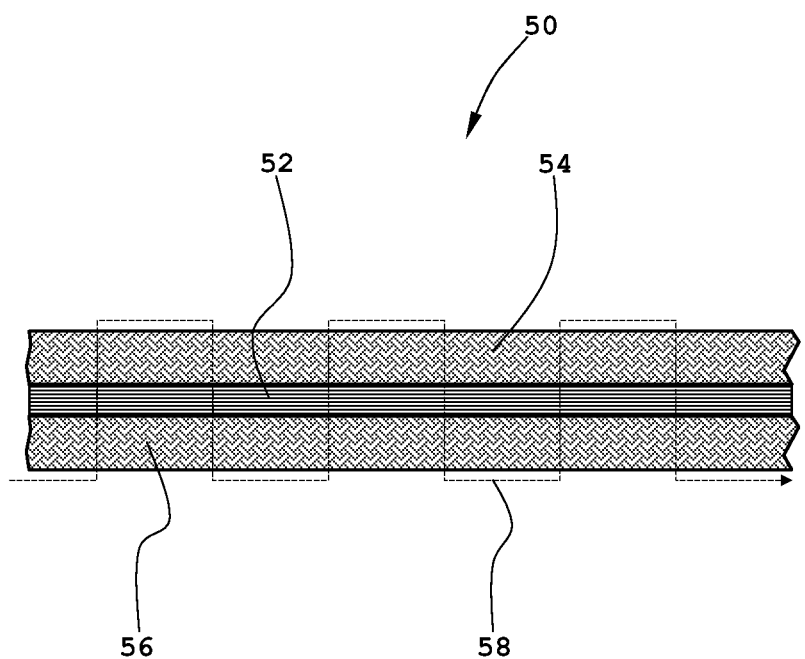
FIG. 3 shows a sectional representation through a variant of embodiment of a thermal joining strip for purposes of joining two thermoplastic components.

FIG. 3 shows a sectional representation through a variant of embodiment of an integrated thermal joining strip for purposes of joining two thermoplastic components in a technically simplified process.

The thermal joining strip 50 comprises amongst other features at least one reactive sheet entity 52, which is covered on both sides, at least in some regions, by two metallic gauzes 54, 56. In order to ensure sufficient mechanical cohesion between the components referred to, these are stitched together by means of at least one metallic wire 58. As an alternative to stitching, other types of connection can be applied, which only require deployment of a small rise in temperature, such as, for example, the use of adhesive. Moreover, the reactive sheet entity 52 features at least one ignition device, not represented here, in order to simplify the initiation of the thermal joining process.

In order to join thermally two thermoplastic components by means of the inventive thermal joining strip 50, it is sufficient to place the thermal joining strip 50, at least in some regions, in position in the intended mating zone between the two components, to align these in relation to one another, to press them together with the application of a defined force and finally to trigger the reactive sheet entity 52 by means of the ignition device. With regard to the properties and the function of the metallic gauzes 54, 56 covering the reactive sheet entity 52 on both sides reference should be made at this point to the statements made in the context of the description of FIGS. 1, 2.

If a component constituted from a thermoplastic plastic is to be joined with a metallic component by means of the inventive thermal joining strip 50, then as a rule it is necessary to replace the metallic gauze located on the side of the metallic component by a metallic foil as a joint filler material.

Thus even large-scale components constituted from thermoplastic plastics and/or from metallic materials, for example, large-scale shell segments for the manufacture of barrel-shaped fuselage sections used in the integration of aeroplanes, can be thermally joined with the thermal joining strip 50 without any problems and cost effectively, and without the deployment of high volume furnaces or heating equipment, at the same time with a high level of process reliability. A further advantage of the thermal joining strip 50 lies in the fact that the heat generation by means of the reactive sheet entity 52 always takes place in a locally limited manner, so that any thermal impairment of the components that are to be joined together and any accompanying structural weakness of the same can to a large extent be eliminated.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS

10 First component (thermoplastic)
12 Second component (thermoplastic)
14 Mating zone
16 Reactive sheet entity
18 Metallic gauze
20 Metallic gauze
22 Mating surface (component)
24 Mating surface (component)
30 First component (metallic)
32 Second component (metallic)
34 Mating zone
36 Reactive sheet entity
38 Metallic foil
40 Metallic gauze
42 Mating surface (component)
44 Mating surface (component)
50 Thermal joining strip
52 Reactive sheet entity
54 Metallic gauze
56 Metallic gauze
58 Metallic wire

What is claimed is:
1. A method for thermal joining of thermoplastic components and metallic components, the method comprising:
arranging at least one reactive sheet entity in a mating zone between a first thermoplastic component and a first metallic component;
disposing, at least in some regions of the mating zone, a first multiply perforated metallic sheet entity configured as a bonding agent on a side of the at least one reactive sheet entity to be joined with the thermoplastic component, wherein a thickness of the first perforated metallic sheet entity is based on a relationship to a melting temperature of the first thermoplastic component;

activating the at least one reactive sheet entity so as to thermally join the first thermoplastic component and the first metallic component in the regions of the mating zone; and repeating the arranging, disposing and activating so as to perform a second thermal joining of a second thermoplastic component and a second metallic component, wherein the second thermoplastic component has a different melting temperature than the first thermoplastic component and a thickness of a second perforated metallic sheet entity is changed relative to the thickness of the first perforated metallic sheet entity based on the relationship.

2. The method as recited in claim 1, wherein the at least one reactive sheet entity is a multi-layer structure having alternating layers of aluminum and nickel foils.

3. The method as recited in claim 1, wherein the perforated metallic sheet entity includes a metallic gauze.

4. The method as recited in claim 1, further comprising disposing, at least in some regions, a non-perforated metallic sheet entity configured as a joint filler material on a side of the reactive sheet entity to be joined with the metallic component before thermally joining the thermoplastic component and the metallic component.

5. The method as recited in claim 4, wherein the non-perforated metallic sheet entity is a metallic foil.

6. The method as recited in claim 1, further comprising applying a mechanical pressure on the thermoplastic and the metallic components so as to press the thermoplastic and the metallic components together before thermally joining the thermoplastic and the metallic components.

7. The method as recited in claim 1, wherein the perforated metallic sheet entity is disposed on the reactive sheet entity so as to form a complete entity that is later arranged in the mating zone before thermally joining the thermoplastic and the metallic components.

8. The method as recited in claim 1, wherein the disposing is performed by at least one of:
    stitching the perforated metallic sheet entity to the reactive sheet entity using at least one metallic wire; and
    adhering the perforated metallic sheet entity to the reactive sheet entity using an adhesive.

* * * * *